United States Patent [19]

Fox

[11] Patent Number: 5,321,391
[45] Date of Patent: Jun. 14, 1994

[54] FISH-BITE INDICATOR

[75] Inventor: Clifford R. Fox, Chelmsford, United Kingdom

[73] Assignee: Fox Design International Limited, Chelmsford, England

[21] Appl. No.: 59,373

[22] Filed: May 12, 1993

[30] Foreign Application Priority Data

May 13, 1992 [GB] United Kingdom ................ 9210262

[51] Int. Cl.$^5$ ...................... G08B 21/00; A01K 97/12
[52] U.S. Cl. ......................................... 340/573; 43/17
[58] Field of Search ............................ 340/573; 43/17

[56] References Cited

U.S. PATENT DOCUMENTS

| 2,671,209 | 3/1954 | Habib | 340/573 |
| 3,798,630 | 3/1974 | Crosthwait | 340/573 |
| 3,868,668 | 2/1975 | Woodbury | 340/573 |
| 4,731,946 | 3/1988 | Blythe et al. | 43/17 |
| 5,063,373 | 11/1991 | Lindsley | 340/573 |

Primary Examiner—Glen R. Swan, III
Attorney, Agent, or Firm—Dickinson, Wright, Moon, Van Dusen & Freeman

[57] ABSTRACT

A fish-bite indicator has a rotary part which is engaged by a fishing line when the indicator is in use, such that longitudinal movement of the fishing line causes the rotary part to rotate. Sensor means are provided to produce a signal for every rotation or part rotation of the rotary part. A counter is connected to the sensor means and constructed to issue an indicator signal in dependence upon each signal or each given count of signals it receives from the sensor means, the counter being constructed so that the number of each given count is alterable. A manually adjustable member is connected to the counter to enable that count to be altered thereby to enable the sensitivity of the indicator to be varied. The invention also extends to a fish-bite indicator comprising a housing having wall means which define (a) a sealed interior of the housing and (b) an enclosure immediately adjacent to the sealed interior. A rotary part is mounted within the enclosure so as to be rotatable therein and has at least one permanent magnet. A magnetic-field sensor is positioned within the sealed interior adjacent to the enclosure, so that rotation of the rotary part by a fishing line when the indicator is in use alters the condition of the magnetic-field sensor to generate a signal indicative of a fish-bite.

9 Claims, 4 Drawing Sheets

FISH-BITE INDICATOR

BACKGROUND AND SUMMARY OF THE INVENTION

The present invention relates to fish-bite indicators. Fish-bite indicators provided hitherto have been so constructed that, to alter their sensitivity, it has been necessary to dismantle them.

A first aspect of the present invention seeks to provide a remedy to this problem.

Accordingly the first aspect of the present invention is directed to a fish-bite indicator having a rotary part which is engaged by a fishing line when the indicator is in use, such that longitudinal movement of the fishing line causes the rotary part to rotate, sensor means provided to produce a signal for every rotation or part rotation of the rotary part, a counter connected to the sensor means and constructed to issue an indicator signal in dependence upon each signal or each given count of signals it receives from the sensor means, the counter being constructed so that the number of each given count is alterable, and a manually adjustable member connected to the counter to enable that count to be altered thereby to enable the sensitivity of the indicator to be varied.

With such an indicator, an angler can readily adjust its sensitivity, without dismantling it, to suit the prevailing wind, wind undertow and water movement conditions.

One previously proposed fish-bite indicator is described in prior British Patent Specification No. 1,503,596. The indicator described in that specification comprises a support for a fishing rod, and a pulley wheel mounted on the support in such a fashion that the line of the rod is able to pass over the pulley wheel so that movement of the line will rotate the wheel. The wheel rotates about a shaft, and is rigidly connected to a rotary member a part of which is positioned between an emitter-detector pair. The latter is located within a housing which also encloses electronic circuitry for producing an alarm signal upon rotation of the pulley wheel.

In such a prior construction, the pulley wheel is exposed to the elements, and ingress of water into the housing along the shaft is possible, so that the indicator may be subject to failure or an erroneous signal.

A second aspect of the present invention seeks to provide a remedy.

Accordingly, this aspect of the invention is directed to a fish-bite indicator comprising a housing having wall means which define (a) a sealed interior of the housing and (b) an enclosure immediately adjacent to the sealed interior, the indicator further comprising a rotary part mounted within the enclosure so as to be rotatable therein and having at least one permanent magnet, the indicator further comprising a magnetic-field sensor positioned within the sealed interior adjacent to the enclosure, so that rotation of the rotary part by a fishing line when the indicator is in use alters the condition of the magnetic-field sensor to generate a signal indicative of a fish-bite.

Preferably, means by which a fishing line can engage the rotary part are in the form of a slot in the enclosure.

The enclosure is desirably provided with drainage means to enable any river water or rain water which finds its way into that enclosure to flow out of the enclosure to reduce the likelihood that such water will accumulate therewithin.

The slot provided as a means to enable a fishing line to engage a rotary part may extend downwardly to an intended bottom of the enclosure, so that the slot itself also constitutes the drainage means.

In a preferred construction, means are provided at an intended bottom of the indicator to enable it to be attached to the top of a bank stick.

The housing may be shaped to have a bifurcated form to provide a seat for a fishing rod, with the enclosure which contains the rotary part positioned immediately underneath the base of the bifurcation.

A preferred construction of fish-bite indicator incorporates the features of both the first and the second aspects of the present invention.

BRIEF DESCRIPTION OF THE DRAWINGS

An example of a fish-bite indicator made in accordance with both the first and second aspects of the present invention will now be described with reference to the accompanying drawings in which.

DESCRIPTION OF THE PREFERRED EMBODIMENT

Figures 1, 1A:
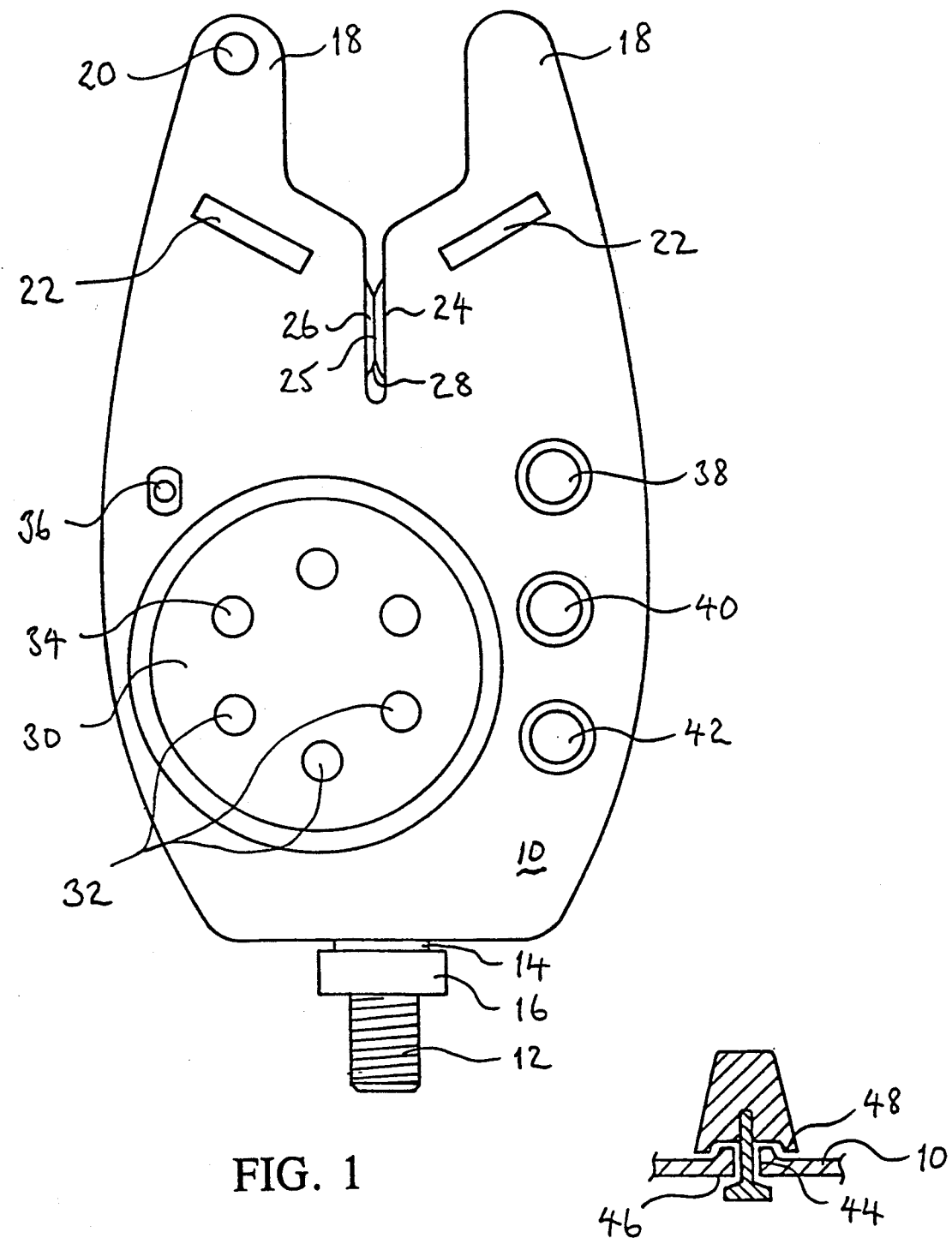
FIG. 1 shows a front elevational view of the indicator.
FIG. 1a shows an axial section through one of the adjustable knobs of the indicator shown in FIG. 1.

The fish-bite indicator shown in FIG. 1 comprises a two-part synthetic plastics injection moulded housing 10 having an external screw-threaded metal shank 12 extending downwardly from its underside. A seal is formed between the housing 10 and the shank 12 by means of an O-ring 14 and a tightening nut 16 which urges the O-ring 14 tightly against the housing 10 and inwardly against the shank 12.

The upper end of the housing 10 is bifurcated, so that it has two generally upwardly extending prongs 18, at the upper end of the left hand of which there is provided a light emitting diode LED 20.

Inwardly recessed ribs 22 are provided at the base of each prong 18 to reinforce the housing in those regions.

A slot 24 extends downwardly from the base of the bifurcation to expose a central portion 25 of a rotary part 26 contained within the housing. This central part is formed with a waist 28, so that it has the form of a pulley-wheel. A generally circular part 30 of the housing 10 is provided underneath the bifurcation, slightly off-set from the longitudinal bisecting plane thereof, and is provided with a plurality of apertures 32 to permit sound to travel more readily through the housing 10 from a generally circular electromagnetic buzzer diaphragm 34 positioned immediately inwardly of the diaphragm cover 30. Immediately above and slightly to the left of the diaphragm cover 30 there is an on-off/test switch 36 extending outwardly from the housing 10.

Three rotary knobs 38, 40 and 42 are provided as a linear array immediately to the right of the diaphragm cover 30, these knobs being, respectively, a volume control, pitch control and sensitivity control for the buzzer.

As shown in FIG. 1a, the housing wall at each knob 38, 40 and 42 is provided with an aperture 44 through which extends a shaft 46 which is rigidly secured to the knob. The wall of the housing 10 is raised at the annulus immediately surrounding the aperture 44. The underside of the knob is provided with a skirt portion 48 which surrounds the raised annulus to form a seal between the knob and the surrounding wall.

Figure 2:
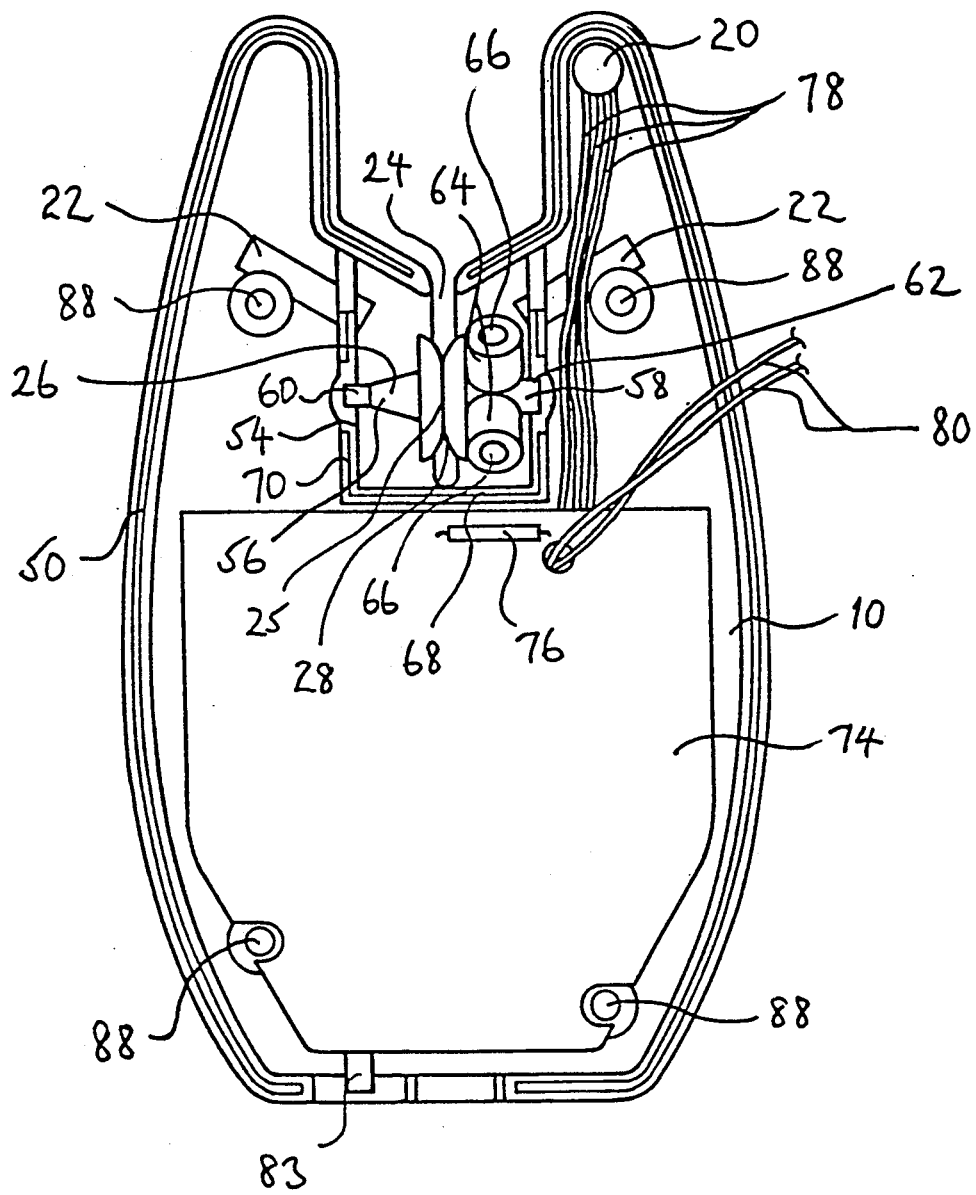
FIG. 2 shows the interior of a first half of the indicator shown in FIG. 1.

FIG. 2 shows the interior of that half of the two-part housing 10 which is visible in FIG. 1, with the other half of the housing 10 removed to reveal interior components of the fish-bite indicator. That edge of the housing half which faces the other half of the housing is formed with a longitudinally extending central rib 50. This engages a correspondingly formed longitudinally extending groove 52 formed on the corresponding edge of the other housing part shown in FIG. 3.

Referring back to FIG. 2, an inner wall 54 is formed in the housing and generally surrounds the slot 24 to form half of an enclosure which contains the rotary part 26.

FIG. 2 shows that the rotary part has a tapering spindle portion 56 extending in an intended horizontal direction away from the central portion 25. A second spindle portion 58 of the rotary part 26 extends outwardly away from the central portion 25 in the opposite direction to that of the spindle portion 56. Respective recesses are formed in respective vertical parts of the inner wall 54 to provide rotary bearing means 60 and 62 respectively for the two spindle portions 56 and 58 of the rotary part 26.

Four cylindrical blocks 64 (only two of which are visible in FIG. 2) extend radially outwardly from the rotary axis of the rotary part 26, spaced apart at 90° intervals therearound, and house respective permanent magnets 66. The length of each cylinder 64 and permanent magnet 66 is such that, when the rotary part is rotated, the distal end of each magnet passes adjacent to a bottom 68 of the inner wall 54.

Figure 3:
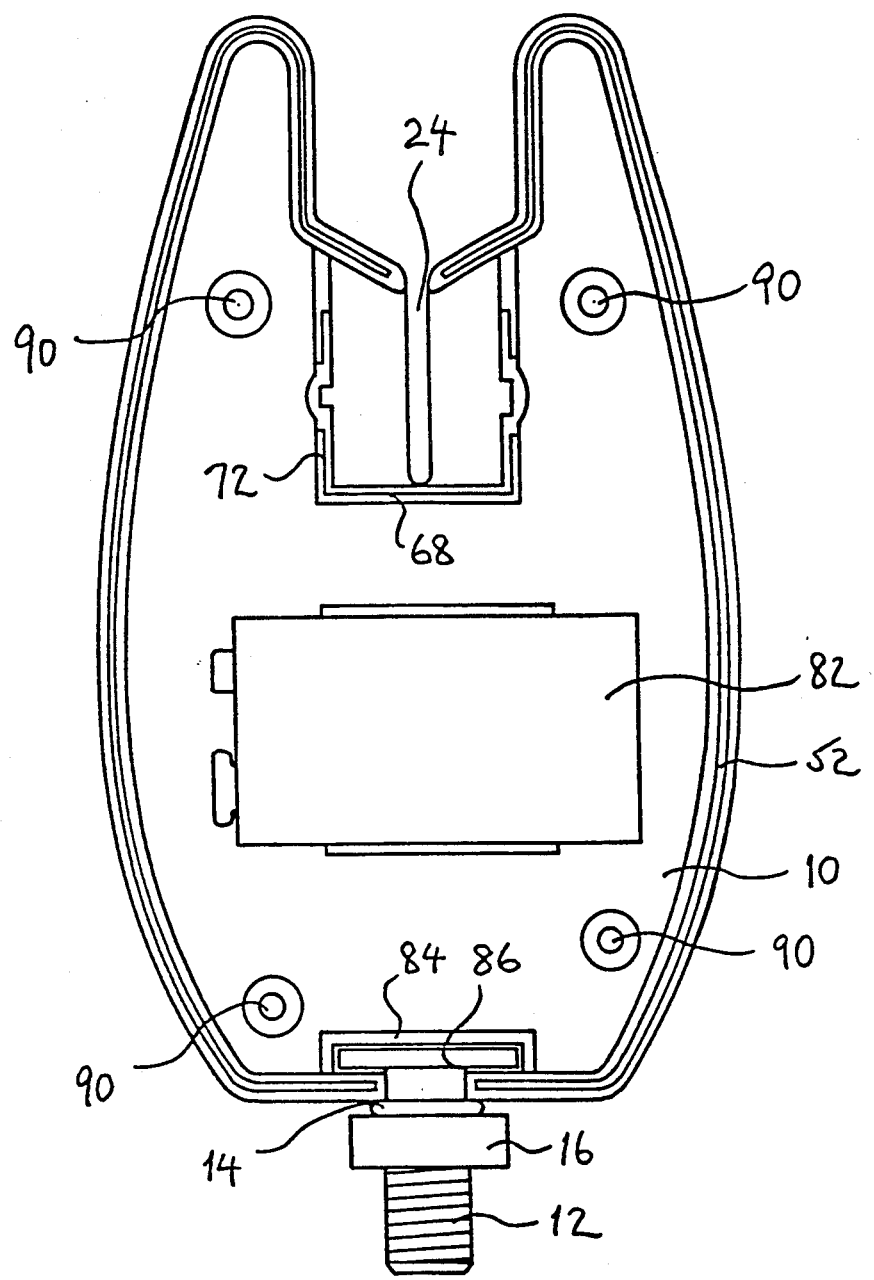
FIG. 3 shows the interior of a second half of the indicator shown in FIG. 1 which mates with the half shown in FIG. 2.

The edges of the inner wall 54 which face the other half of the housing 10 shown in FIG. 3, are provided with formations 70 which interengage with corresponding formations 72 formed on corresponding inner edges of the other half of the rotary part enclosure shown in FIG. 3, to form a seal therewith.

The slot 24 in each half of the housing 10 extends to the upper face of the bottom 68 of the enclosure so that any water which finds its way into the enclosure can readily drain outwardly therefrom.

From the foregoing description, it will be appreciated that the housing, together with the inner wall 54, defines a sealed interior. The latter contains a printed circuit board 74 which is fixed to the interior of the housing 10 and which includes a reed switch 76 mounted on the circuit board 74 immediately adjacent to the bottom 68 of the inner wall 54, within range of the magnetic fields of the permanent magnets 66 as the latter pass by the bottom 68 when the rotary part 26 rotates.

The printed circuit board 74 is connected to the LED 20 via leads 78, and power leads 80 extend from the printed circuit board 74 to a 9 volt alkaline battery 82 shown in FIG. 3.

The on-off/test switch 36, the buzzer having the buzzer diaphragm 34, and each of the three control knobs 38, 40 and 42 shown in FIG. 1 are all connected to the circuit board 74 to define circuitry shown in greater detail, and described hereinafter, with reference to FIG. 4.

An extension socket 83 extends through the bottom of the housing 10 and is also connected to the printed circuit board 74.

FIG. 3 shows a bridging wall portion 84 of the housing which extends around an upper flange 86 of the shank 12. The flange 86 and the nut 16 therefore clamp tightly on to the bottom of the wall of the housing 10 to fix the shank 12 rigidly to the housing 10.

Internally screw-threaded horizontally extending portions 88 are formed in the interior of the housing part shown in FIG. 2, and apertures 90 formed in the housing part shown in FIG. 3 in registration with the portions 88 when the two housing parts are brought together, enable screws (not shown) to secure those two housing parts tightly together with the rib 50 engaging the groove 52.

Figure 4:
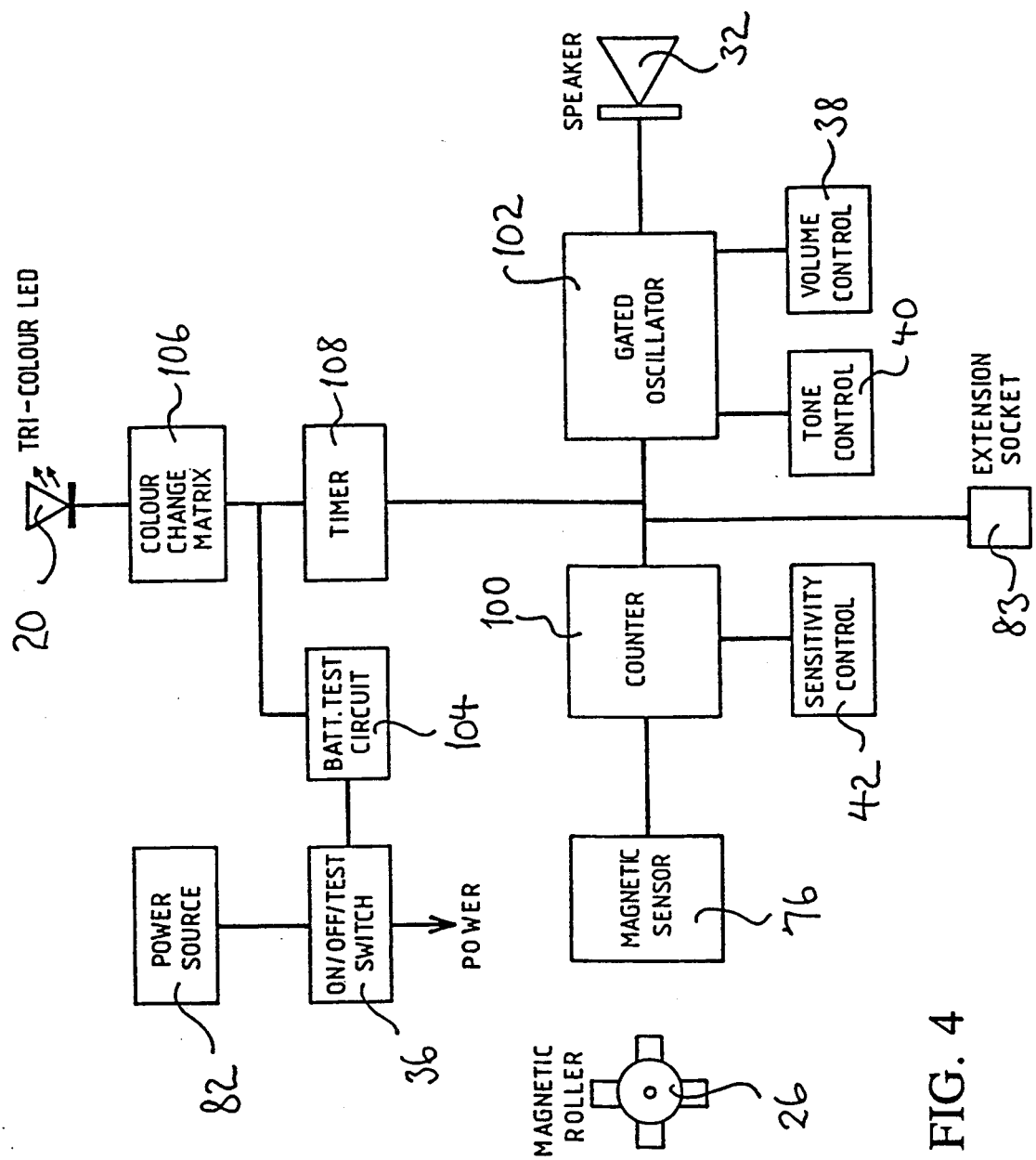
FIG. 4 shows a circuit diagram of electronic circuitry contained within the indicator shown in FIG. 1.

The manner in which the various parts of the indicator are connected together via the circuit board 74 is shown in FIG. 4. Thus, the reed switch 76 is connected to the buzzer having a diaphragm 32 via a digital counter 100 and a gated oscillator 102 connected in series in that order passing from the switch 76 to the buzzer.

The volume control 38 and the pitch control 40 are connected directly to the gated oscillator to vary the volume and pitch respectively of the sound emitted by the buzzer having the diaphragm 32.

The sensitivity control 42 is connected to the counter 100. Adjustment of the sensitivity control 42 as a result alters the number of pulses the counter receives from the reed switch 76 before it issues a square-wave pulse to the gated oscillator 102.

As also shown in FIG. 4, the battery 82 is connected to power the various parts of the circuitry via the on-off/test switch 36. A further output from that switch is connected to a battery test circuit 104 having an output connected to the LED 20 via a colour change matrix. When the switch 36 is pushed to a test position (away from which it is resiliently urged by means (not shown) to its off position), the battery test circuit 104 measures the voltage from the battery 82 and causes the LED 20 to flash for about one second if the power provided by the battery 82 is acceptable, or to remain in the on condition for the duration of the test period (being the period during which the switch 36 is held in the test position) if the battery is providing inadequate power. Naturally, if the battery is providing no power at all the LED will not be illuminated. A fixed delay off type a timer 108 connected between the output of the counter 100 and the LED 20 latches to the on condition, to switch the LED on, for a predetermined duration of for example ten seconds upon receipt of a pulse from the counter 100.

Preferably, the circuitry comprises microprocessors and other integrated semi-conductor microchips duly programmed to operate in accordance with the manner of operation described herein.

When the fish-bite indicator is installed for use, the shank 12 is screwed into an internally screw-threaded portion at the top of a bank stick (not shown) so that the prongs 18 project upwardly. A portion of a fishing rod is then seated in the bifurcation, and the line of the fishing rod passes through the slot 24 so that it rests with tension on the rotary part 26.

The indicator may now be switched on at the switch 36. Subsequent movement of the line resulting from a fish-bite will then rotate the rotary part 26 so that the reed switch 76 is switched on every time one of the four magnets 66 passes close to it. The resulting electrical pulses generated by the reed switch are passed to the counter 100, which in turn passes a square-wave pulse to the LED 20 and also to the gated oscillator 102 with a frequency that is dependent upon the setting of the sensitivity control. In a first, most sensitive setting of the sensitivity control, an output pulse will be generated by the counter 100 to pass to the gated oscillator 102 every time the counter 100 receives a signal from the reed switch 76. In a second rotary setting of the sensitivity control knob 42, the counter 100 will only issue a pulse to the gated oscillator 102 every time it completes a count of two signals from the reed switch 76. In a further rotary setting, the count needed for the counter 100 to issue a signal is four, in a further setting it is eight, and so on. As a result, therefore, the distance of movement of the line along its length, to cause the counter 100 to issue a square-wave pulse, will vary according to the setting of the sensitivity control knob 42.

The gated oscillator 102 forwards an oscillatory signal to the buzzer having the diaphragm 32 every time it receives an output from the counter 100, for the duration of the output pulse from the counter 100. The frequency of the oscillation is determined by the setting of the pitch control knob 40, and the amplitude of the oscillations is determined by the setting of the volume control knob 38. Thus the pitch and volume of the audible signal which eminates from the buzzer can be varied by the pitch control knob 40 and the volume control knob 38 respectively, whilst the frequency with which successive buzzes occur, for a given angular velocity of the rotary part, can be varied by the sensitivity control knob 42. Expressing the sensitivity in another way, adjustment of the control knob 42 varies the amount of longitudinal movement of the fishing line, when the indicator is in use, that has to occur before the LED 20 flashes or the buzzer buzzes. For example, the minimum detectable movement might be as little as 45 mm (3/16 inch), or as much as 762 mm (3 inches). In this way, the indicator indicates not only the amount of line movement, but also the rate of line movement.

It will be appreciated that the LED 20 may be a tri-colour (red, yellow or green) LED, the actual colour of which can be altered by appropriate changes to the colour change matrix 106, in a fashion which is known per se, by appropriately positioning jumpers an terminals of the matrix 106.

The extension socket 83 may be used to relay the signal from the counter 100 to a remote monitor (not shown) which may for example be inside an angler's bivouac. Such a monitor may be provided with an alarm which is triggered in the event that the monitor becomes disconnected from the indicator.

Numerous variations and modifications to the illustrated indicator will occur to a reader of ordinary skill in the art without taking the resulting indicator outside the scope of the present invention. In particular, for example, so far as the first aspect of the present invention is concerned, the magnets 66 and reed switch 76 could be replaced by a photo-emitter pair, the radiation path between which is alternately made and broken by a rotary part, or by a rotary wheel attached thereto. So far as the second aspect of the present invention is concerned, only one of the items comprising the LED 20, the buzzer having the diaphragm 32, and the extension socket 83 may be provided with the other two being omitted. The different settings of the sensitivity switch described herein may be obtained with different "click" position of the knob 42, the "click" position being defined by interenganging formations (not shown) for example formed on the underside of the knob 42 and the upper side of raised position of the wall of the housing 10.

The illustrated indicator may be so constructed that its power comsumption is very low.

I claim:

1. A fish-bite indicator having a rotary part which is engaged by a fishing line when the indicator is in use, such that longitudinal movement of the fishing line causes the rotary part to rotate, sensor means provided to produce a signal for every rotation of the rotary part through a predermined angle, a counter connected to the sensor means and constructed to issue an indicator signal in dependence upon each given count of signals it receives from the sensor means, which count is any integral number from one inclusive upwards, the counter being constructed so that the number of each given count is alterable, and a manually adjustable member connected to the counter to enable that count to be altered thereby to enable the sensitivity of the indicator to be varied.

2. A fish-bite indicator according to claim 1, in which means are provided at an intended bottom of the indicator to enable it to be attached to the top of a bank stick.

3. A fish-bite indicator comprising a housing having wall means which define (a) a sealed interior of the housing and (b) an enclosure immediately adjacent to the sealed interior, the indicator further comprising a rotary part mounted within the enclosure so as to be rotatable therein and having at least one permanent magnet, the indicator further comprising a magnetic-field sensor positioned within the sealed interior adjacent to the enclosure, so that rotation of the rotary part by a fishing line when the indicator is in use alters the condition of the magnetic-field sensor to generate a signal indicative of a fish-bite.

4. A fish-bite indicator according to claim 3, in which means by which a fishing line can engage the rotary part are provided in the form of a slot in the enclosure.

5. A fish-bite indicator according to claim 4, in which the slot provided as a means to enable a fishing line to engage a rotary part may extend downwardly to an intended bottom of the enclosure, so that the slot itself also constitutes the drainage means.

6. A fish-bite indicator according to claim 3, in which the enclosure is provided with drainage means to enable any water which finds its way into that enclosure to flow out of the enclosure to reduce the likelihood that such water will accumulate therewithin.

7. A fish-bite indicator according to claim 3, in which means are provided at an intended bottom of the indicator to enable it to be attached to the top of a bank stick.

8. A fish-bite indicator according to claim 3, in which the housing is shaped to have a bifurcated form to provide a seat for a fishing rod, with the enclosure which contains the rotary part positioned immediately underneath the base of the bifurcation.

9. A fish-bite indicator having a rotary part which is engaged by a fishing line when the indicator is in use, such that longitudinal movement of the fishing line causes the rotary part to rotate, sensor means provided to produce a signal for every rotation of the rotary part through a predetermined angle, a counter connected to the sensor means and constructed to issue an indicator signal in dependence upon each given count of signals it receives from the sensor means, which count is any integral number from one inclusive upwards, the counter being constructed so that the number of each given count is alterable, and a manually adjustable member connected to the counter to enable that count to be altered thereby to enable the sensitivity of the indicator to be varied, the indicator comprising a housing having wall means which define (a) a sealed interior of the housing and (b) an enclosure immediately adjacent to the sealed interior, the rotary part being mounted within the enclosure so as to be rotatable therein and having at least one permanent magnet, the said sensor means being a magnetic-field sensor positioned within the sealed interior adjacent to the enclosure, so that rotation of the rotary part by a fishing line when the indicator is in use alters the condition of the magnetic-field sensor to generate a signal indicative of a fish-bite.

* * * * *